(12) United States Patent
Ikemoto

(10) Patent No.: US 11,859,675 B2
(45) Date of Patent: Jan. 2, 2024

(54) FRICTION ENGAGEMENT DEVICE AND METHOD OF FORMING THE SAME

(71) Applicant: Mazda Motor Corporation, Hiroshima (JP)

(72) Inventor: Takayuki Ikemoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/725,843

(22) Filed: Apr. 21, 2022

(65) Prior Publication Data

US 2022/0381301 A1 Dec. 1, 2022

(30) Foreign Application Priority Data

May 26, 2021 (JP) ................................. 2021-088234

(51) Int. Cl.
*F16D 25/12* (2006.01)
*F16D 25/0638* (2006.01)

(52) U.S. Cl.
CPC ....... *F16D 25/123* (2013.01); *F16D 25/0638* (2013.01); *F16D 2250/0007* (2013.01)

(58) Field of Classification Search
CPC .............. F16D 25/0638; F16D 25/123; F16D 13/72–74
See application file for complete search history.

(56) References Cited

U.S. PATENT DOCUMENTS

| 4,458,797 A * | 7/1984 | Hawkins ................. F16D 48/02 |
| | | 192/85.25 |
| 5,755,314 A * | 5/1998 | Kanda ................. F16D 25/0638 |
| | | 192/113.36 |
| 6,464,059 B1 * | 10/2002 | Kundermann .......... F16D 47/06 |
| | | 192/48.618 |
| 10,138,949 B2 | 11/2018 | Hattori |
| 2021/0310524 A1 * | 10/2021 | Kitazawa .............. F16D 13/648 |

FOREIGN PATENT DOCUMENTS

JP 6135431 B2 5/2017

* cited by examiner

*Primary Examiner* — David R Morris
(74) *Attorney, Agent, or Firm* — Alleman Hall Creasman & Tuttle LLP

(57) ABSTRACT

A friction engagement device of an automatic transmission is provided with a cylindrical drum part supporting an annular friction plate. The drum part includes a cylindrical body with a spline part having serrations extending in the axial direction and depressed radially outward to fit with the friction plate, in an inner circumferential side surface, a vertical wall part provided at an end side of the cylindrical body and extending radially inward, and a corner part provided between the cylindrical body and the vertical wall part. A drum recess is formed inside the corner part, connected to the serration and depressed toward an axial end side. A cut part is provided outside the corner part, connected to the drum recess, and cut in the circumferential direction of the drum part. The drum recess is opened to an outside by the cut part to form an oil gallery.

5 Claims, 7 Drawing Sheets

FRICTION ENGAGEMENT DEVICE AND METHOD OF FORMING THE SAME

TECHNICAL FIELD

The present disclosure relates to a friction engagement device and a method of forming the same, particularly to a friction engagement device of an automatic transmission mounted on a vehicle, and a method of forming the same.

BACKGROUND OF THE DISCLOSURE

As a friction engagement device of an automatic transmission mounted on a vehicle, it is known that a multiplate wet clutch includes a cylindrical drum, a cylindrical hub disposed coaxially inside the drum, a plurality of annular friction plates disposed on an inner circumference of the drum and an outer circumference of the hub, respectively, a piston which presses the friction plates to fasten the friction plates to each other, and a hydraulic chamber which generates oil pressure for the piston to press the friction plates.

This multiplate wet clutch realizes a gear change of the vehicle by controlling the oil pressure inside the hydraulic chamber and changing torque which occurs between the plurality of friction plates being pressed by the piston.

Further, in the multiplate wet clutch, the surfaces of the friction plates are lubricated with lubricating oil supplied from radially inward. Therefore, the multiplate wet clutch improves the wear resistance and the cooling performance of the friction plates, and absorbs an impact when the friction plates are engaged.

On the other hand, when the lubricating oil remains inside the drum and the friction plates are not engaged, since drag torque occurs in the friction plates, it is necessary to provide oil galleries which connect inside the drum with the outside to discharge the lubricating oil from between the plurality of friction plates.

For example, JP6135431B2 discloses a multiplate wet clutch. In this clutch, oil galleries which connect inside the drum with the outside are provided at a spline part which is provided in an inner circumference of the drum so as to fit with the friction plates, and has serrations which are depressed radially outward.

In addition, in the friction engagement device of JP6135431B2, when forming the oil galleries in the drum part, a plurality of oil galleries may be formed by drilling the drum part. However, since it is necessary to form each oil gallery after the position of the drill is adjusted to the oil gallery, the machining time becomes long and the productivity of the friction engagement device drops.

SUMMARY OF THE DISCLOSURE

Thus, one purpose of the present disclosure is to provide a friction engagement device and a method of forming the same, in which a plurality of oil galleries can be formed with sufficient productivity.

According to one aspect of the present disclosure, a friction engagement device of an automatic transmission provided with a cylindrical drum part supporting an annular friction plate is provided. The friction plate is provided in an outer circumferential side surface with a tooth part projecting radially outward. The drum part includes a cylindrical body including a spline part having serrations extending in the axial direction of the drum part and depressed radially outward so as to fit onto the tooth part of the friction plate, in an inner circumferential side surface, a vertical wall part provided at an end side of the cylindrical body, and extending radially inward, and a corner part provided between the cylindrical body and the vertical wall part. A drum recess is formed inside the corner part, the drum recess being connected to the serration of the spline part, and being depressed toward an end side of the drum part in the axial direction. A cut part is provided outside the corner part, the cut part being connected to the drum recess, and being cut in the circumferential direction of the drum part. The drum recess is opened to an outside by the cut part to form an oil gallery.

According to this configuration, in the friction engagement device, the oil gallery is formed by forming the drum part by, for example, die-casting, and cutting by turning the outside of the corner part of the drum part in the circumferential direction, without adjusting each machining position. Therefore, the friction engagement device provided with the oil gallery is short in the machining time, and its productivity improves.

The drum part may be a die-cast article.

According to this configuration, in the friction engagement device, the oil gallery is formed by die-casting the drum part, and cutting by turning the outside of the corner part of the drum part in the circumferential direction, for example, without adjusting each machining position. Therefore, the friction engagement device provided with the drum part in which the oil gallery is formed is short in machining time, and its productivity improves.

Inside the cylindrical body of the drum part, a cylindrical piston provided with an inclined part that inclines radially inward toward the end side of the cylindrical body may be disposed between the vertical wall part and the friction plate. A lubricating oil discharge hole passing through the inside and the outside of the inclined part may be formed in the inclined part of the piston.

According to this configuration, by the lubricating oil discharge hole formed in the inclined part of the piston disposed between the vertical wall part inside the drum part and the friction plate, when the piston presses the friction plate, the lubricating oil which remains inside the piston is discharged outside the piston through the lubricating oil discharge hole. Therefore, the centrifugal force due to the lubricating oil can be suppressed from acting on the piston.

A serration side surface that is depressed radially outward along the serration and extends in the axial direction of the drum part may be provided in the serration of the spline part of the drum part. The oil gallery may be formed along the serration side surface, when seen in the axial direction of the cylindrical body.

According to this configuration, since the oil gallery is formed along the serration side surface of the spline part in the drum part, the opening area becomes larger, thereby smoothly discharging the lubricating oil which remains between the friction plate and the serration.

According to another aspect of the present disclosure, a method of forming a friction engagement device of an automatic transmission provided with a cylindrical drum part supporting an annular friction plate, is provided. The friction plate is provided in an outer circumferential side surface with a tooth part projecting radially outward. The drum part includes a cylindrical body including a spline part having serrations extending in the axial direction of the drum part and depressed radially outward so as to fit onto the tooth part of the friction plate, in an inner circumferential side surface, a vertical wall part provided at an end side of the cylindrical body, and extending radially inward, and a corner part provided between the cylindrical body and the vertical wall part. A drum recess is formed inside the corner part, the drum recess being connected to the serration of the spline part, and being depressed toward an end side of the drum part in the axial direction. The method includes die-casting the drum part, outside the corner part, to form a press-out part that projects outside, at a position corresponding to the drum recess, and cutting the press-out part of the corner part of the drum part that is die-cast, to cut the drum part so that a cut part connected to the drum recess is formed in the circumferential direction of the drum part. The drum recess is opened to the outside by the cut part after the cutting to form an oil gallery.

According to this method, by die-casting the drum part, and cutting (for example, turning) in the circumferential direction the press-out part provided outside the corner part of the drum part, the oil gallery can be formed, without adjusting each machining position. Therefore, the method of forming the oil gallery is short in the machining time, and the productivity of the friction engagement device improves.

DETAILED DESCRIPTION OF THE DISCLOSURE

Hereinafter, embodiments of the present disclosure will be described with reference to the accompanying drawings.

Figure 1:
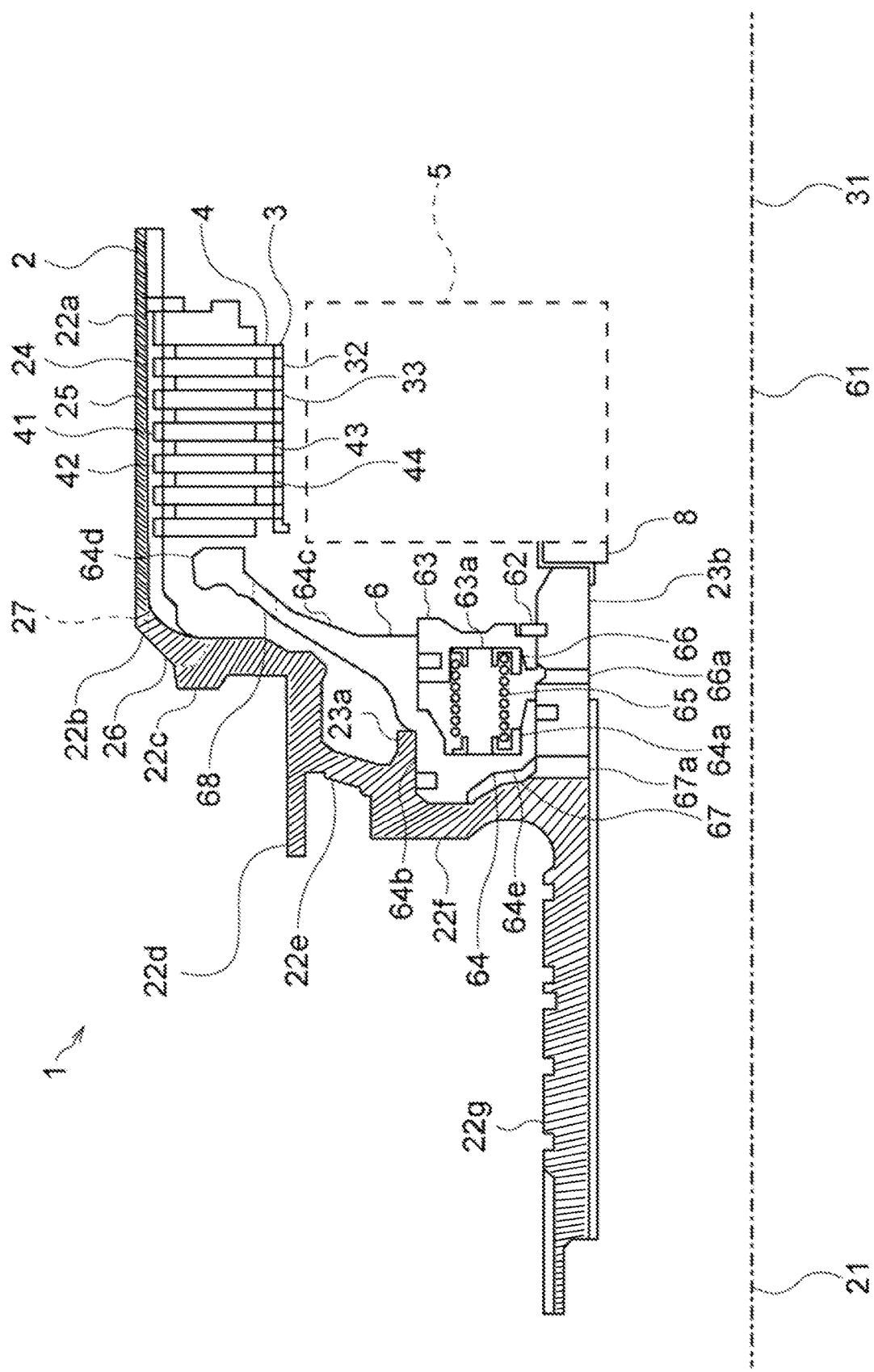
FIG. 1 is an outline cross-sectional view illustrating a friction engagement device according to one embodiment of the present disclosure.

FIG. 1 is an outline cross-sectional view illustrating a friction engagement device according to one embodiment of the present disclosure. As illustrated in FIG. 1, a friction engagement device 1 according to this embodiment of the present disclosure is constituted as a friction engagement device of an automatic transmission mounted on a vehicle.

The friction engagement device 1 includes a cylindrical drum part 2, a cylindrical hub part 3 which is disposed coaxially inside the drum part 2, a plurality of annular friction plates 4 which are disposed so as to be lined up along an axis 21 of the drum part 2 and an axis 31 of the hub part 3, in an inner circumference of the drum part 2 and an outer circumference of the hub part 3, a planetary gear 5 (illustrated by a broken line) which is disposed inside the hub part 3, and a piston 6 which is disposed inside the drum part 2, at a first end side (e.g., left in FIG. 1) of the drum part 2 from the friction plates 4 and the planetary gear 5, and presses the friction plates 4 with oil pressure by sliding along the axis 21 of the drum part 2 and the axis 31 of the hub part 3.

The drum part 2 includes a first drum cylindrical body 22a which is provided around the axis 21 of the drum part 2, a corner part 22b which is provided at a first end side of the first drum cylindrical body 22a, and inclines radially inward as it goes to the first end side of the drum part 2, a first drum vertical wall part 22c which is provided at the first end side of the corner part 22b, and extends radially inward, a second drum cylindrical body 22d extending on the first end side along the axis 21 from an inner end part of the first drum vertical wall part 22c, an inclined part 22e which is provided at the first end side of the second drum cylindrical body 22d, and inclines radially inward as it goes to the first end side of the drum part 2, a second drum vertical wall part 22f which is provided at the first end side of the inclined part 22e, and extends radially inward, and a third drum cylindrical body 22g which extends on the first end side along the axis 21 from an inner end part of the second drum vertical wall part 22f.

The drum part 2 is provided with a first inner drum cylindrical body 23a which extends towards a second end side (e.g., right in FIG. 1) along the axis 21 of the drum part 2, between the inclined part 22e and the second drum vertical wall part 22f.

Further, the drum part 2 is provided with a second inner drum cylindrical body 23b which extends toward the second end side along the axis 21 from a second end side of the third drum cylindrical body 22g. A thrust bearing 8 is disposed at the second end side of the second inner drum cylindrical body 23b. The thrust bearing 8 contacts the second end side of the second inner drum cylindrical body 23b and a first end side of the planetary gear 5 to permit a relative rotation between the drum part 2 and the planetary gear 5.

In an inner circumference of the first drum cylindrical body 22a of the drum part 2, a plurality of spline parts 25 are formed by being depressed radially outward. The spline parts 25 have serrations 24 extending along the axis 21 of the drum part 2, and the serrations 24 are formed at equal intervals in the circumferential direction. Further, in the inner circumference of the first drum cylindrical body 22a of the drum part 2, a plurality of annular drum-side friction plates 41 are disposed so as to be lined up along the axis 21 of the drum part 2. In an outer circumference of the drum-side friction plates 41, a plurality of drum-side tooth parts 42 which project radially outward are provided at equal intervals in the circumferential direction. The drum-side tooth parts 42 spline-fit into the serrations 24 of the spline parts 25 formed in the inner circumference of the first drum cylindrical body 22a of the drum part 2.

In the outer circumference of the hub part 3, a plurality of spline parts 33 are provided at equal intervals in the circumferential direction. The spline parts 33 have serrations 32 which are depressed radially inward and extend along the axis 31 of the hub part 3. Further, a plurality of annular hub-side friction plates 43 are provided on the outer circumference of the hub part 3, so as to be lined up along the axis 31 of the hub part 3. In an inner circumference of the hub-side friction plate 43, a plurality of hub-side tooth parts 44 are provided. The hub-side tooth parts 44 which project radially inward are provided at equal intervals in the circumferential direction. The hub-side tooth parts 44 spline-fit into the serrations 32 of the spline part 33 formed in the outer circumference of the hub part 3.

The cylindrical piston 6 fits into a space formed between the second drum vertical wall part 22f, the first inner drum cylindrical body 23a and the second inner drum cylindrical body 23b of the drum part 2, and the planetary gear 5. An axis 61 of the piston 6 extends coaxially with the axis 21 of the drum part 2 and the axis 31 of the hub part 3.

The piston 6 includes an annular snap ring 62 attached to an outer circumference of the second inner drum cylindrical body 23b, a cylindrical spring retainer 63 attached to the outer circumference of the second inner drum cylindrical body 23b so as to contact a first end side of the snap ring 62, a cylindrical piston part 64 attached to the outer circumference of the second inner drum cylindrical body 23b between the spring retainer 63 and the second drum vertical wall part 22f so as to be slidable along the axis 61, and a return spring 65 disposed between the spring retainer 63 and the piston part 64 so as to bias the piston part 64 to the first end side along the axis 61.

The spring retainer 63 is provided on a first end side of the spring retainer 63 with a spring retainer recess 63a which is depressed toward the second end side. A centrifugal balance hydraulic chamber 66 is formed in a space between the spring retainer recess 63a and the piston part 64.

On the second end side of the piston part 64, the piston part 64 includes a piston recess 64a which is depressed toward the first end side, a piston cylindrical body 64b provided in an outer circumference of the piston part 64, a piston outer inclined part 64c which extends in an outer circumference of the piston cylindrical body 64b so as to incline radially inward as it goes toward first end side, and a piston pressing part 64d which extends at the second end of the piston outer inclined part 64c toward the second end side so as to press the drum-side friction plate 41 of the drum part 2 along the axis 21 of the drum part 2. Further, the piston part 64 is slidable along the axis 61 in a state where the outer circumference of the piston cylindrical body 64b fits into an inner circumference of the first inner drum cylindrical body 23a of the drum part 2, and an inner circumference of the piston cylindrical body 64b fits onto an outer circumference of the spring retainer 63.

The piston part 64 is provided at the first end side of the piston part 64 with a piston inner inclined part 64e which inclines radially inward as it goes toward the second end side. A hydraulic chamber 67 is formed in a space between the piston inner inclined part 64e and the second drum vertical wall part 22f.

In the second inner drum cylindrical body 23b, a centrifugal balance oiling hole 66a which extends radially toward the centrifugal balance hydraulic chamber 66, and an oiling hole 67a which extends radially toward the hydraulic chamber 67 are formed.

Between an inner circumference of the piston part 64 and the outer circumference of the second inner drum cylindrical body 23b of the drum part 2, between the inner circumference of the piston cylindrical body 64b and the outer circumference of the spring retainer 63, and between the outer circumference of the piston cylindrical body 64b and the inner circumference of the first inner drum cylindrical body 23a, an annular oil seal (in FIG. 1, it is illustrated in a rectangular shape) is provided.

Into the drum part 2, lubricating oil is supplied from radially inward of the second inner drum cylindrical body 23b. Further, also to the centrifugal balance hydraulic chamber 66 and the hydraulic chamber 67 of the piston 6, the lubricating oil is supplied from the centrifugal balance oiling hole 66a and the oiling hole 67a, respectively.

By supplying the lubricating oil from the oiling hole 67a formed in the second inner drum cylindrical body 23b of the drum part 2 toward the hydraulic chamber 67 of the piston 6, the piston part 64 of the piston 6 compresses the return spring 65 disposed on the second end side of the piston part 64 toward the second end side, and slides toward the second end side along the axis 61. Therefore, since the piston pressing part 64d of the piston part 64 presses the drum-side friction plates 41 of the drum part 2 toward the second end side along the axis 21 of the drum part 2, the drum-side friction plate 41 and the hub-side friction plate 43 of the hub part 3 engage with each other.

On the other hand, by discharging the lubricating oil from the hydraulic chamber 67 of the piston 6 via the oiling hole 67a formed in the second inner drum cylindrical body 23b of the drum part 2, the return spring 65 of the compressed piston 6 expands toward the first end side, and slides the piston part 64 of the piston 6 toward the first end side along the axis 61. Therefore, since the piston pressing part 64d of the piston part 64 moves toward the first end side along the axis 21 of the drum part 2 so as to separate from the drum-side friction plate 41 of the drum part 2, the engagement between the drum-side friction plate 41 and the hub-side friction plate 43 of the hub part 3 is canceled.

When the lubricating oil is discharged from the hydraulic chamber 67 of the piston 6 via the oiling hole 67a formed in the second inner drum cylindrical body 23b of the drum part 2, part of the lubricating oil may remain inside the hydraulic chamber 67. At this time, when the vehicle is operated, the piston 6 of the friction engagement device 1 rotates to cause a centrifugal force of the lubricating oil which remains inside the hydraulic chamber 67. With this centrifugal force, although the lubricating oil is discharged from the hydraulic chamber 67, the piston part 64 of the piston 6 may slide toward the second end side along the axis 61, and the piston pressing part 64d of the piston part 64 may press the drum-side friction plate 41 of the drum part 2 toward the second end side along the axis 21 of the drum part 2. Therefore, the piston 6 is constructed so that, when the lubricating oil is discharged from the hydraulic chamber 67, the lubricating oil is supplied from the centrifugal balance oiling hole 66a formed in the second inner drum cylindrical body 23b of the drum part 2 toward the centrifugal balance hydraulic chamber 66 of the piston 6 so as to balance the oil pressure of the hydraulic chamber 67, the oil pressure of the centrifugal balance hydraulic chamber 66, and the restoring force of the return spring 65.

Figure 2:
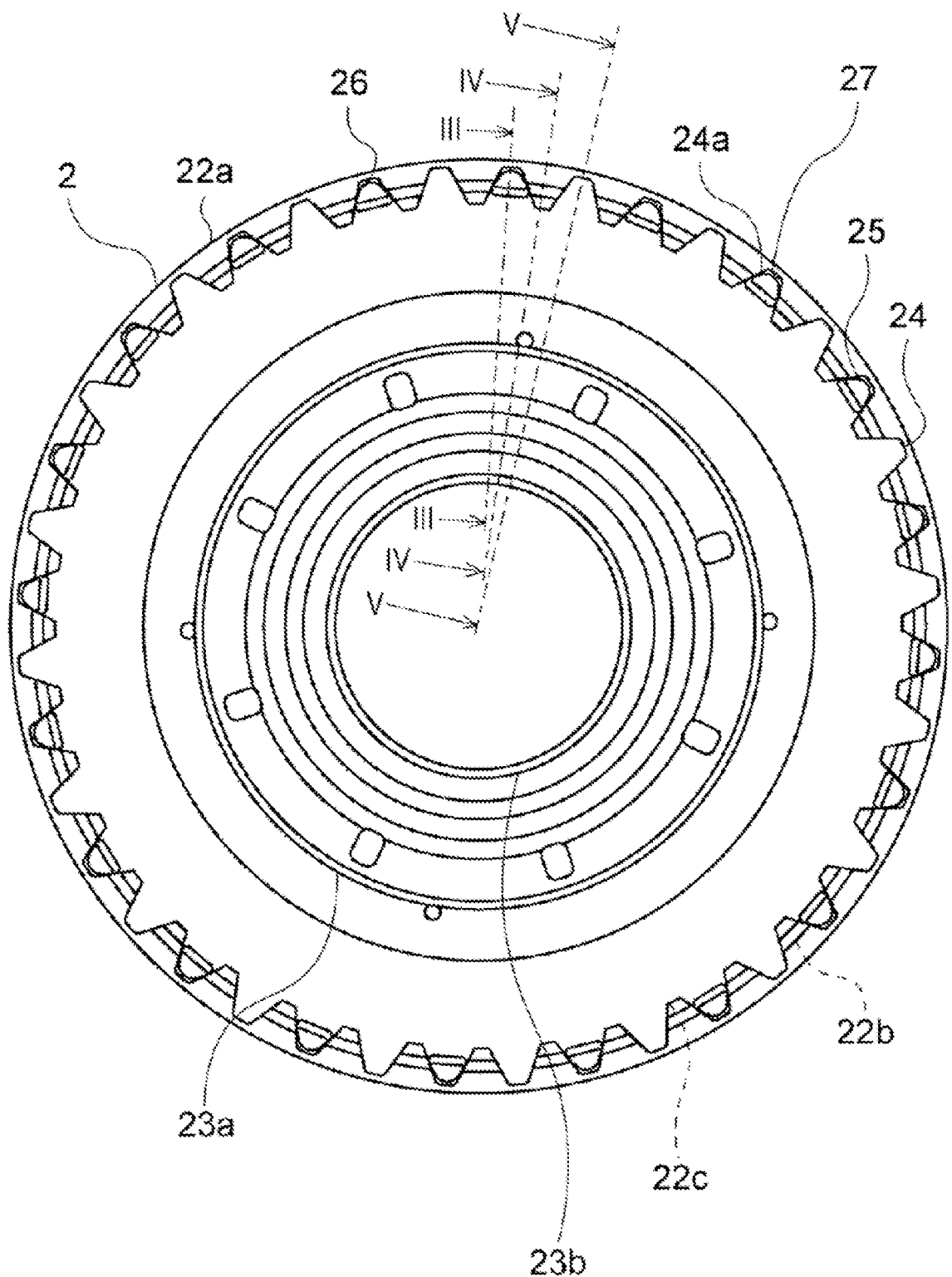
FIG. 2 is an outline front view of a drum part of the friction engagement device of FIG. 1.

FIG. 2 is an outline front view of the drum part 2 of the friction engagement device 1 of FIG. 1. A plurality of oil galleries 26 are formed in the outside of the corner part 22b provided between the first drum cylindrical body 22a and the first drum vertical wall part 22c of the drum part 2. The oil galleries 26 are depressed radially outward and formed in the inner circumference of the first drum cylindrical body 22a at equal intervals so as to correspond to the circumferential positions of the plurality of spline parts 25 having the serrations 24 extending along the axis 21 of the drum part 2. Particularly, in this embodiment, the oil galleries 26 are formed with intervals in the circumferential direction so as to skip every other spline part 25.

Figure 3:
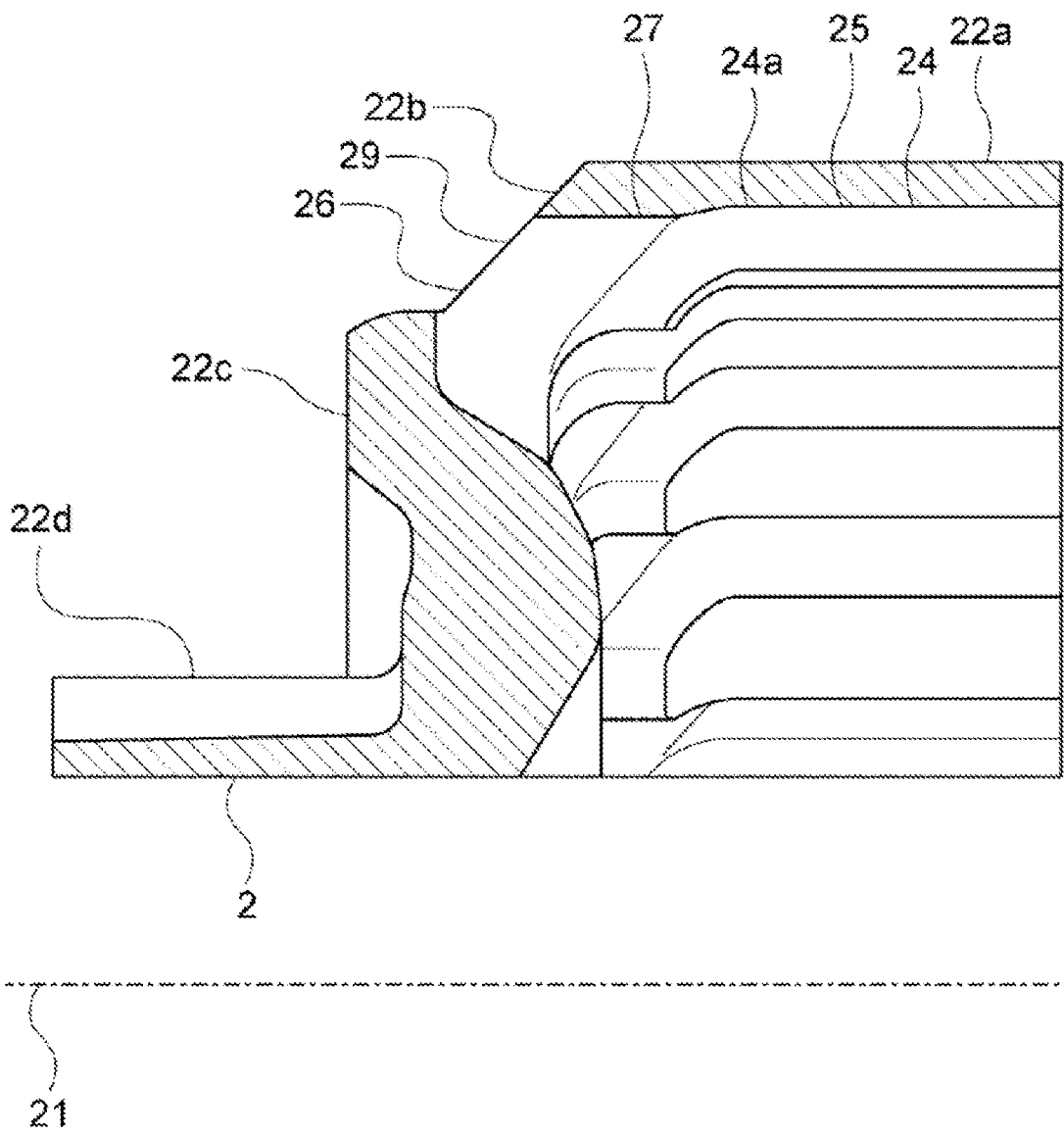
FIG. 3 is an outline cross-sectional view of the drum part, taken along a line of FIG. 2.

FIG. 3 is an outline cross-sectional view of the drum part 2, taken along a line of FIG. 2. Inside the corner part 22b provided between the first drum cylindrical body 22a and the first drum vertical wall part 22c of the drum part 2, a drum recess 27 is formed so that it is connected to the serration 24 of the spline part 25 formed in the inner circumference of the first drum cylindrical body 22a, and is depressed toward the first end side along the axis 21 of the drum part 2. The drum recess 27 is connected to the oil gallery 26 formed outside the corner part 22b.

In the serration 24 of the spline part 25 formed in the inner circumference of the first drum cylindrical body 22a, serration side surfaces 24a which are depressed radially outward along the serration 24 and extend along the axis 21 of the drum part 2 are formed. The serration side surface 24a extends toward the first end side along the axis 21 so as to be connected to the drum recess 27 formed inside the corner part 22b.

Returning to FIG. 2, since the oil gallery 26 is formed along the serration side surface 24a when seen from the axis 21 of the drum part 2, it can be seen in a semicircular shape.

Returning to FIG. 1, in the piston outer inclined part 64c of the piston part 64 of the piston 6 disposed inside the first drum cylindrical body 22a of the drum part 2, a lubricating oil discharge hole 68 extending along the axis 61 of the piston 6 is formed so as to pass through the inside and the outside of the piston outer inclined part 64c.

By discharging the lubricating oil from the hydraulic chamber 67 of the piston 6 via the oiling hole 67a formed in the second inner drum cylindrical body 23b of the drum part 2, when the piston part 64 of the piston 6 slides toward the first end side along the axis 61 to cancel the engagement between the drum-side friction plate 41 and the hub-side friction plate 43 of the hub part 3 which are pressed by the piston pressing part 64d of the piston part 64, the lubricating oil which remains inside the piston outer inclined part 64c can be discharged outside the piston outer inclined part 64c via the lubricating oil discharge hole 68 formed in the piston outer inclined part 64c of the piston 6, and can further be discharged outside from the oil gallery 26 connected to the drum recess 27. Further, by the oil gallery 26 formed along the serration side surface 24a of the serration 24 of the spline part 25 formed in the drum part 2, the lubricating oil which remains between the serration 24 and the drum-side friction plate 41 which spline-fits into the serration 24 can be smoothly discharged outside from the oil gallery 26 connected to the serration 24 via the drum recess 27.

Figure 4:
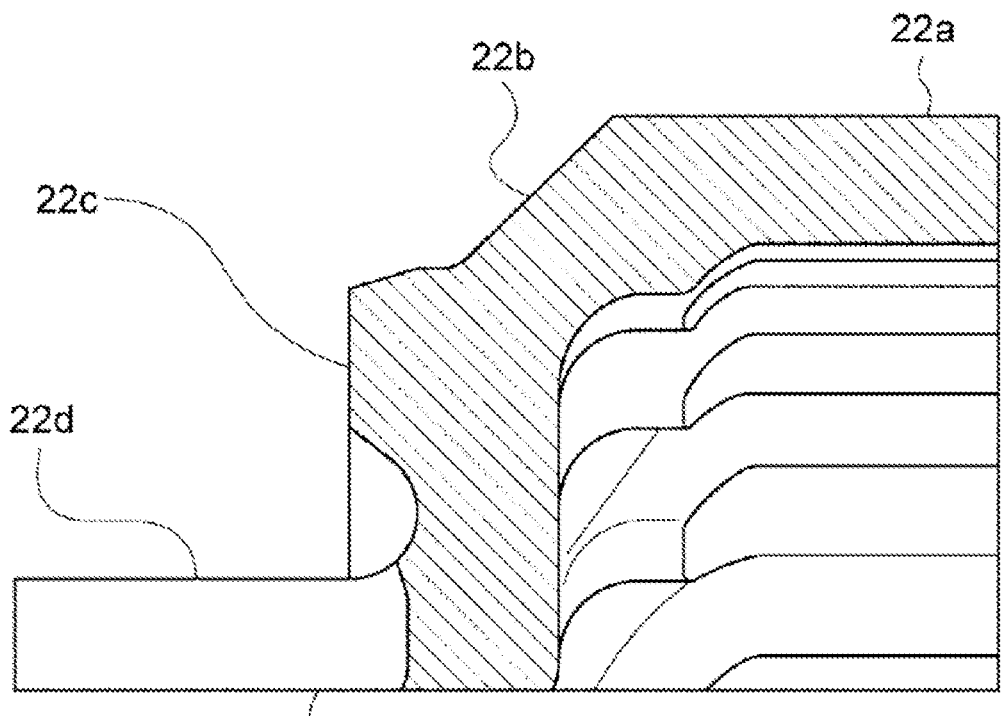
FIG. 4 is an outline cross-sectional view of the drum part, taken along a line IV-IV of FIG. 2.

FIG. 4 is an outline cross-sectional view of the drum part 2, taken along a line IV-IV of FIG. 2. Particularly, FIG. 4 illustrates a cross section between two adjacent spline parts 25 formed in the inner circumference of the first drum cylindrical body 22a. The thickness radially outward of the first drum cylindrical body 22a where the spline part 25 is not formed as illustrated in FIG. 4, is larger than the thickness thereof where the spline part 25 is formed as illustrated in FIG. 3.

Figure 5:
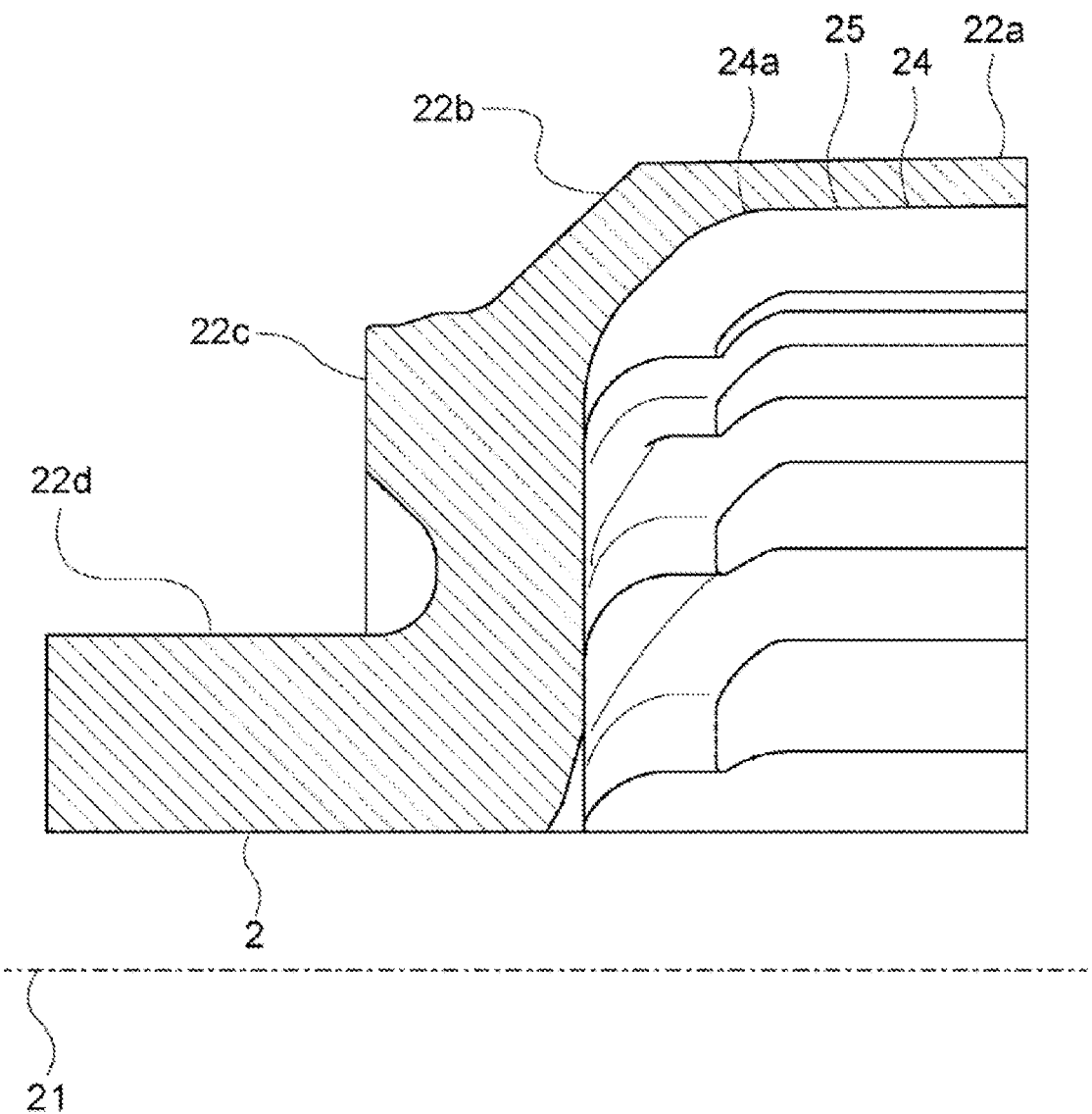
FIG. 5 is an outline cross-sectional view of the drum part, taken along a line V-V of FIG. 2.

FIG. 5 is an outline cross-sectional view of the drum part 2, taken along a line V-V of FIG. 2. Particularly, FIG. 5 illustrates a cross section of another spline part 25a which is adjacent to the spline part 25 connected to the oil gallery 26 formed in the inner circumference of the first drum cylindrical body 22a. In another spline part 25a of FIG. 5, the drum recess connected to the serration side surface 24a of serration 24 of the spline part 25 illustrated in FIG. 3, and the oil gallery connected to the drum recess are not formed.

Figure 6:
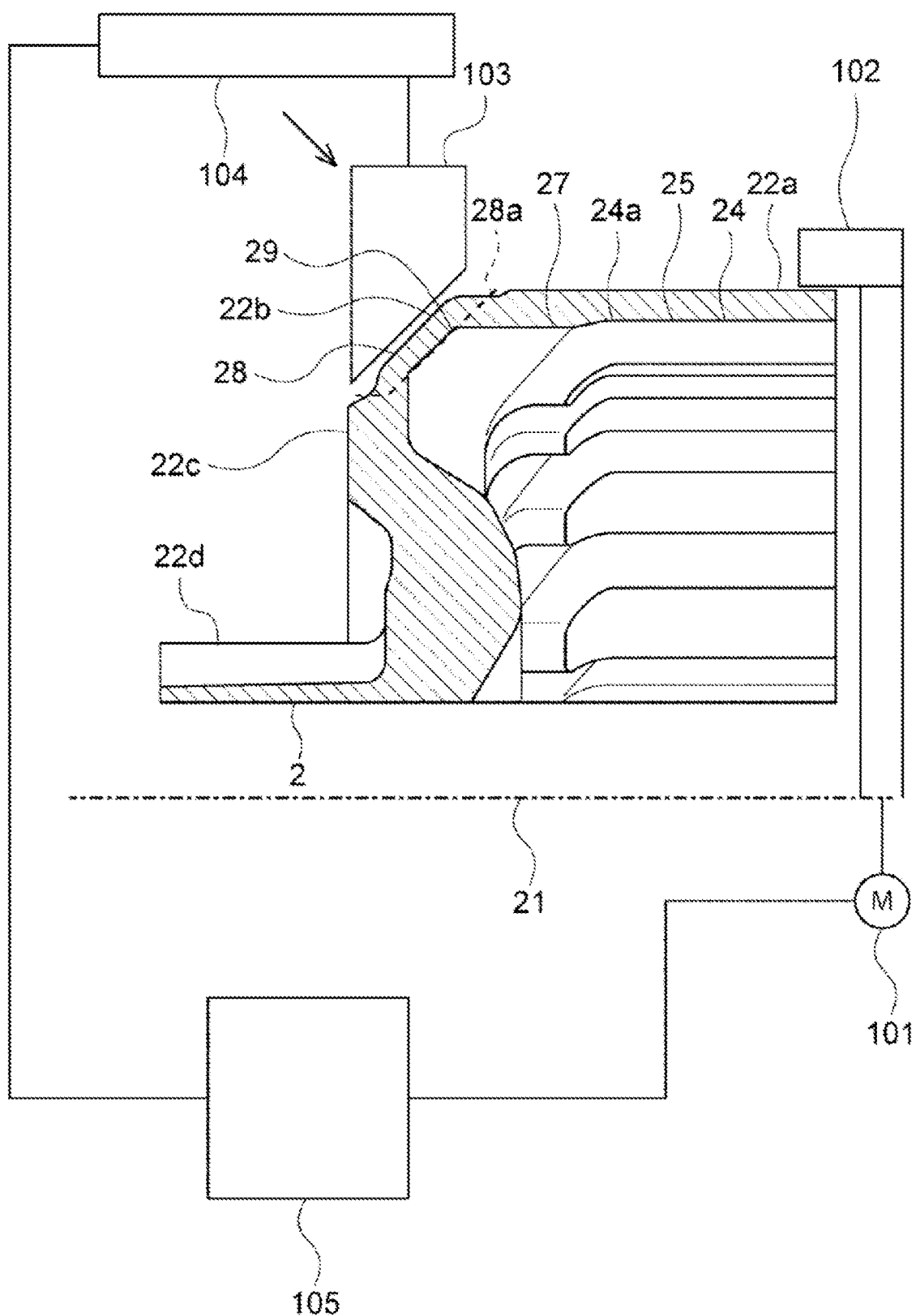
FIG. 6 is a view illustrating a method of forming oil galleries in a corner part of the drum part of FIG. 2.

FIG. 6 is a view illustrating a method of forming the oil gallery 26 of the corner part 22b of the drum part 2 of FIG. 2.

In the forming method illustrated in FIG. 6, first, on the outside of the corner part 22b, the drum part 2 is formed by die casting so that a press-out part 28 which projects outside in a direction perpendicular to the surface of the corner part 22b is formed at a position corresponding to the drum recess 27 of the drum part 2. As illustrated, the press-out part 28 is provided, outside the corner part 22b, radially outward of a scheduled cutting line 28a illustrated by a broken line.

The second end side of the first drum cylindrical body 22a of the drum part 2 is fixed to a fixture 102 which is rotated by a motor 101 with respect to the drum part 2 which is a die-cast article. A cutting tool 103 for lathe turning which extends in the radial direction of the drum part 2 is disposed radially outward of the drum part 2 so that it opposes to the outer surface of the press-out part 28. This cutting tool 103 is connected to a tool moving mechanism 104 which moves the cutting tool 103 along the axis 21 of the drum part 2 and in the radial direction of the drum part 2. The motor 101 and the tool moving mechanism 104 are electrically connected to a controller 105 disposed externally to control the drive of the motor 101 and the tool moving mechanism 104.

In the drum part 2 disposed as described above, when the oil gallery 26 is fabricated outside the corner part 22b of the drum part 2, the motor 101 rotates based on an electric signal transmitted from the controller 105. Here, the drum part 2 fixed to the fixture 102 via the first drum cylindrical body 22a rotates on the axis 21 together with the fixture 102 which is rotated by the motor 101.

Next, when the tool moving mechanism 104 operates based on the electric signal transmitted from the controller 105, the cutting tool 103 moves to the second end side along the axis 21 of the drum part 2, and moves radially inward of the drum part 2, toward the press-out part 28 provided to the corner part 22b of the drum part 2. The cutting tool 103 which is moved by the tool moving mechanism 104 is pressed against the press-out part 28 provided to the corner part 22b of the drum part 2 which rotates on the axis 21. The cutting tool 103 pressed against the press-out part 28 cuts by turning the drum part 2 so that a cut part 29 connected to the drum recess 27 is formed in the circumferential direction of the drum part 2, by cutting the press-out part 28 of the drum part 2 which is die-cast (i.e., a part radially outward of the scheduled cutting line 28a illustrated by the broken line). By forming the cut part 29 connected to the drum recess 27, the drum recess 27 is opened to the outside, and the oil gallery 26 connected to the drum recess 27 is formed.

Thus, in the friction engagement device 1 according to this embodiment, outside the corner part 22b provided between the first drum cylindrical body 22a and the first drum vertical wall part 22c, the cut part 29 cut in the circumferential direction of the drum part 2 is provided so as to be connected to the drum recess 27 which is provided inside the corner part 22b so as to be connected to the serration 24 of the spline part 25 formed in the drum part 2, and is depressed on the first end side along the axis 21 of the drum part 2. According to the cut part 29, the drum recess 27 is opened outside to form the oil gallery 26 connected to the drum recess 27.

In the friction engagement device 1, the oil gallery 26 is formed by die-casting the drum part 2, and cutting by turning the outside of the corner part 22b of the drum part 2 in the circumferential direction, without adjusting each machining position. Therefore, the friction engagement device 1 provided with the drum part 2 in which the oil gallery 26 is formed is short in the machining time, and its productivity improves.

Further, the lubricating oil discharge hole 68 formed in the piston outer inclined part 64c of the piston 6 disposed between the first drum vertical wall part 22c inside the drum part 2 and the friction plates 4 extends along the axis 21 of the drum part 2. Thus, when the piston 6 presses the drum-side friction plates 41 of the friction plates 4, the lubricating oil which remains inside the piston 6 is discharged outside the piston 6 through the lubricating oil discharge hole 68. Therefore, the centrifugal force due to the lubricating oil can be suppressed from acting on the piston 6.

Further, since the oil gallery 26 is formed along the serration side surface 24a of the spline part 25 formed in the drum part 2, the opening area becomes larger, thereby smoothly discharging the lubricating oil which remains between the friction plates 4 and the serrations 24.

Further, according to the method of forming the friction engagement device 1, by die-casting the drum part, and cutting (turning) in the circumferential direction the press-out part 28 provided outside the corner part 22b of the drum part 2, the oil gallery 26 can be formed, without adjusting each machining position. Therefore, since the method of forming the oil gallery 26 is short in the machining time, the productivity of the friction engagement device 1 improves.

Although in this embodiment the oil gallery 26 is formed in the semicircular shape along the serration side surface 24a, it may be formed in a triangular shape or a trapezoidal shape along the serration side surface 24a.

Figure 7:
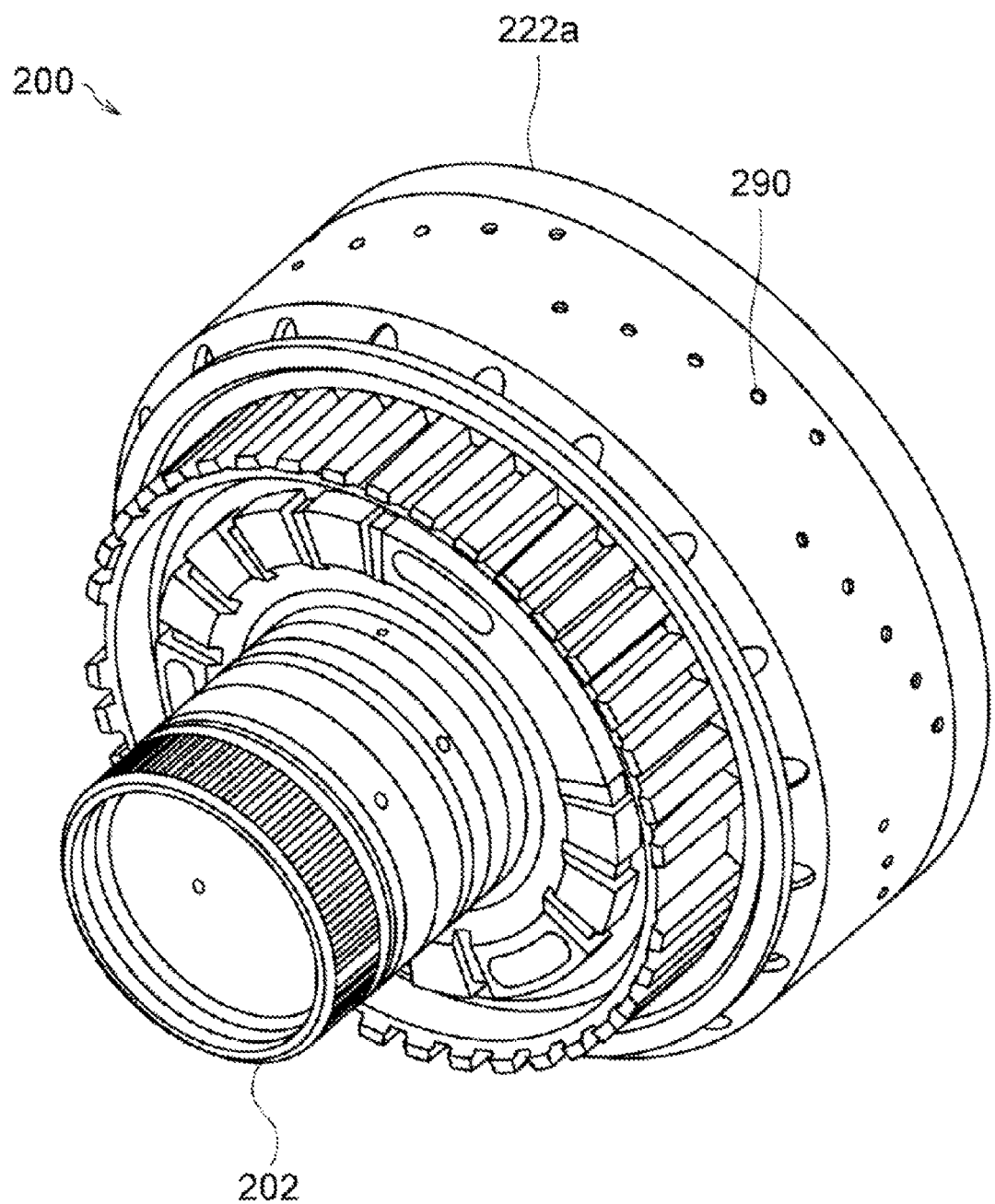
FIG. 7 is a schematic view of a drum part of a friction engagement device according to another embodiment.

FIG. 7 is a schematic view of a drum part 202 of a friction engagement device 200 according to another embodiment. As illustrated in FIG. 7, a plurality of oil galleries 290 which extend in the radial direction may be formed in an outer circumference of a first drum cylindrical body 222a of the drum part 202 so as to be connected to the serrations of the spline parts formed in an inner circumference of the first drum cylindrical body 222a.

The present disclosure is not limited to the illustrated embodiments, and various improvements and various design changes may be possible without departing from the spirit of the present disclosure.

As described above, according to the present disclosure, since it becomes possible to easily form the plurality of oil galleries, it may be utilized suitably for the manufacturing technology field of vehicles which carry the automatic transmission having the friction engagement device.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Friction Engagement Device
2 Drum Part
22a Cylindrical Body (First Drum Cylindrical Body)
22b Corner Part
22c Vertical Wall Part (First Drum Vertical Wall Part)
24 Serration
25 Spline Part
26 Oil Gallery
27 Drum Recess
29 Cut Part
41 Friction Plate (Drum-side Friction Plate)
42 Tooth Part (Drum-side Tooth Part)

What is claimed is:

1. A friction engagement device of an automatic transmission provided with a cylindrical drum part supporting an annular friction plate, the friction plate being provided in an outer circumferential side surface with a tooth part projecting radially outward, and the drum part comprising:
a cylindrical body including a spline part having serrations extending in an axial direction of the drum part and depressed radially outward so as to fit onto the tooth part of the friction plate, in an inner circumferential side surface;
a vertical wall part provided at an end side of the cylindrical body, and extending radially inward; and
a corner part provided between the cylindrical body and the vertical wall part,
wherein a drum recess is formed inside the corner part, the drum recess being connected to the serration of the spline part and being depressed toward an end side of the drum part in the axial direction,
wherein a cut part is provided outside the corner part, the cut part being connected to the drum recess and being cut in a circumferential direction of the drum part,
wherein the drum recess is opened to an outside by the cut part to form an oil gallery,
wherein the drum part is a die-cast article,
wherein inside the cylindrical body of the drum part, a cylindrical piston provided with an inclined part that inclines radially inward toward the end side of the cylindrical body is disposed between the vertical wall part and the friction plate, and
wherein a lubricating oil discharge hole passing through the inside and the outside of the inclined part is formed in the inclined part of the piston.

2. The friction engagement device of claim 1,
wherein a serration side surface that is depressed radially outward along the serration and extends in the axial direction of the drum part is provided in the serration of the spline part of the drum part, and
wherein the oil gallery is formed along the serration side surface, when seen in the axial direction of the cylindrical body.

3. A friction engagement device of an automatic transmission provided with a cylindrical drum part supporting an annular friction plate, the friction plate being provided in an outer circumferential side surface with a tooth part projecting radially outward, and the drum part comprising:
a cylindrical body including a spline part having serrations extending in an axial direction of the drum part and depressed radially outward so as to fit onto the tooth part of the friction plate, in an inner circumferential side surface;
a vertical wall part provided at an end side of the cylindrical body, and extending radially inward; and
a corner part provided between the cylindrical body and the vertical wall part,
wherein a drum recess is formed inside the corner part, the drum recess being connected to the serration of the spline part and being depressed toward an end side of the drum part in the axial direction,
wherein a cut part is provided outside the corner part, the cut part being connected to the drum recess and being cut in a circumferential direction of the drum part,
wherein the drum recess is opened to an outside by the cut part to form an oil gallery,
wherein inside the cylindrical body of the drum part, a cylindrical piston provided with an inclined part that inclines radially inward toward the end side of the cylindrical body is disposed between the vertical wall part and the friction plate, and
wherein a lubricating oil discharge hole passing through the inside and the outside of the inclined part is formed in the inclined part of the piston.

4. The friction engagement device of claim 3,
wherein a serration side surface that is depressed radially outward along the serration and extends in the axial direction of the drum part is provided in the serration of the spline part of the drum part, and
wherein the oil gallery is formed along the serration side surface, when seen in the axial direction of the cylindrical body.

5. A method of forming a friction engagement device of an automatic transmission provided with a cylindrical drum part supporting an annular friction plate, the friction plate being provided in an outer circumferential side surface with a tooth part projecting radially outward, and the drum part including a cylindrical body including a spline part having serrations extending in an axial direction of the drum part and depressed radially outward so as to fit onto the tooth part of the friction plate, in an inner circumferential side surface; a vertical wall part provided at an end side of the cylindrical body, and extending radially inward; and a corner part provided between the cylindrical body and the vertical wall part, wherein a drum recess is formed inside the corner part, the drum recess being connected to the serration of the spline part, and being depressed toward an end side of the drum part in the axial direction, the method comprising:
- die-casting the drum part, outside the corner part, to form a press-out part that projects outside, at a position corresponding to the drum recess; and
- cutting the press-out part of the corner part of the drum part that is die-cast, to cut the drum part so that a cut part connected to the drum recess is formed in a circumferential direction of the drum part,
- wherein the drum recess is opened to the outside by the cut part after the cutting to form an oil gallery.

\* \* \* \* \*